(12) United States Patent
Hippold et al.

(10) Patent No.: US 7,576,158 B2
(45) Date of Patent: Aug. 18, 2009

(54) REACTIVE SINGLE-COMPONENT COATING AND/OR ADHESIVE GRANULATE

(75) Inventors: Theodor Hippold, Bad Salzuflen (DE); Felix Starck, Detmold (DE); Christian Terfloth, Detmold (DE)

(73) Assignee: Jowat AG, Detmold (DE)

( * ) Notice: Subject to any disclaimer, the term of this patent is extended or adjusted under 35 U.S.C. 154(b) by 188 days.

(21) Appl. No.: 10/505,126

(22) PCT Filed: Feb. 6, 2003

(86) PCT No.: PCT/EP03/01184

§ 371 (c)(1),
(2), (4) Date: Aug. 19, 2004

(87) PCT Pub. No.: WO03/070851

PCT Pub. Date: Aug. 28, 2003

(65) Prior Publication Data

US 2005/0160940 A1   Jul. 28, 2005

(30) Foreign Application Priority Data

Feb. 19, 2002 (DE) ............... 102 06 992
Mar. 13, 2002 (DE) ............... 102 10 956

(51) Int. Cl.
C08L 75/04 (2006.01)
C08G 18/28 (2006.01)
B29B 9/10 (2006.01)

(52) U.S. Cl. .................. 524/871; 524/874; 524/875; 524/590; 524/578; 528/85; 528/68; 528/902; 264/142

(58) Field of Classification Search .............. 524/871, 524/874, 875, 590, 578; 528/85, 68, 902; 264/142
See application file for complete search history.

(56) References Cited

U.S. PATENT DOCUMENTS

| 3,627,714 A | 12/1971 | Merkl |
| 4,569,981 A * | 2/1986 | Wenzel et al. ............... 528/67 |
| 4,990,364 A | 2/1991 | Bolte et al. |
| 5,100,995 A | 3/1992 | Münzmay et al. |
| 5,356,945 A | 10/1994 | Werner et al. |
| 5,441,808 A | 8/1995 | Anderson et al. |
| 6,686,415 B1 * | 2/2004 | Terfloth et al. ............... 524/589 |
| 6,716,527 B1 | 4/2004 | Czmok et al. |
| 7,005,476 B1 * | 2/2006 | Terfloth et al. ............... 525/123 |

FOREIGN PATENT DOCUMENTS

| CA | 2084359 | | 6/1994 |
| DE | 10030911 A1 | | 3/2001 |
| EP | 0 600 767 A1 | | 6/1994 |
| EP | 1 114 854 A1 | | 7/2001 |
| JP | 62-095371 A | | 5/1987 |
| JP | 2-272-013 A | | 11/1990 |
| JP | 5-214312 A | | 8/1993 |
| JP | 8-259923 A | | 10/1996 |
| JP | 10017625 A1 | | 1/1998 |
| JP | 2001-11419 A | | 1/2001 |
| WO | 93 25599 A1 | | 12/1993 |
| WO | WO 99/58590 | * | 11/1999 |
| WO | WO 00/34129 | * | 6/2000 |
| WO | WO 00/47687 A1 | | 8/2000 |
| WO | 01 72922 A1 | | 4/2001 |
| WO | WO 02/090454 A1 | | 11/2002 |

OTHER PUBLICATIONS

Oertel; Polyurethane Handbook; Hanser Gardner Publications, New York; 1985; pp. 527-529.*

* cited by examiner

Primary Examiner—Vasu Jagannathan
Assistant Examiner—Benjamin Gillespie
(74) Attorney, Agent, or Firm—David S. Safran; Roberts Mlotkowski; Safran & Cole, P.C.

(57) ABSTRACT

Disclosed is the production of isocyanate-based or silane-functional adhesive and/or coating materials in the form of reactive single-component granulates and the use thereof. In particular, the reactive one-component coating-material and/or adhesive granules of the include at least one isocyanate-reactive starting polymer and at least one diisocyanate and/or polyisocyanate. Optionally, the granules of the invention may further include at least one catalyst and/or at least one wax and/or at least one resin and/or at least one preferably non-isocyanate-reactive polymer. The granules of the invention may contain an excess of diisocyanate and/or polyisocyanate which amounts to 0.5% to 30 w %, and is preferably generated by free terminal isocyanate groups.

21 Claims, No Drawings

REACTIVE SINGLE-COMPONENT COATING AND/OR ADHESIVE GRANULATE

BACKGROUND OF THE INVENTION

1. Filed of Invention

The present invention relates to reactive one-component coating-material and/or adhesive granules, to processes for preparing them and to their use.

2. Description of Related Art

Coating materials and hot-melt adhesives are known in a large number. Use is made, for example, of isocyanate-containing polyurethane coating materials and adhesives.

These polyurethane coating materials and adhesives comprise, for example, moisture-curing or moisture-crosslinking isocyanate-containing polyurethanes which are solid at room temperature and are applied in the form of their melt as an adhesive. The polymeric constituents of these adhesives are polyurethane groups and reactive isocyanate groups. Cooling in applied melt causes first a rapid physical setting of the hot-melt adhesive as a result of its solidification. This is followed by a chemical reaction of the remaining isocyanate groups with moisture from the ambient environment, to form a crosslinked, infusible material. For many applications these isocyanate-containing polyurethane adhesives are solvent-free and viscous. For further details relating to isocyanate-containing polyurethane polymers reference may be made to H. F. Müller, H. Müller, "Shaping Reactive Hotmelts Using LMW Copolyesters", Adhesive Age, November 1987, pages 32 to 35.

Alternatively it is possible to prepare reactive coating materials and adhesives on the basis of silane-functional polymers, too.

Compositions based on isocyanate-containing or silane-functional polymers for coating materials and adhesive materials of this kind are known from patent application WO 00/47687 A1, which describes a process for continuous preparation of a multi-component coating and adhesive material based on isocyanate-terminated or silane-functional polymers and also the use thereof for adhesive bonding or coating, respectively. These materials are prepared by mixing the individual components, in particular with heating to bring them into a liquid state, and are then supplied immediately for their use. In the case of an adhesive material based on isocyanates the two components are composed on the one hand of a relatively high molecular mass starting polymer and on the other hand of a reactive isocyanate-terminated crosslinker. When an adhesive or coating material based on silane-functional polymers is used a reaction takes place between a relatively high molecular mass starting polymer and a reactive silane-functional crosslinker.

The use of multi-component systems in the preparation of hot-melt adhesive and coating materials is known. On this point reference may be made, for example, to "Handbook of adhesives", 2nd Edition, p. 581 ff. and to "The ICI polyurethanes book", 2nd Edition, p. 93 ff. In the case of these multi-component systems there is exclusively a reaction of the components with one another and, after reaction has taken place, there is no longer any remaining reactivity for subsequent reactions with, for example, moisture.

For certain applications, however, there may be a desire to use coating and adhesive systems which are in one-component form, since these do not require mixing prior to their application. Mixing of the individual constituents of a multi-component system, on the other hand, is generally more laborious and has to be integrated into a processing operation; this generally necessitates complex additional apparatus, such as metering devices for the different components, for example, and in addition there is in particular a risk of metering errors. Moreover, rapid processing of the multi-component systems prepared is necessary, so that the constituents, especially under the influence of moisture, do not react before the desired application.

SUMMARY OF THE INVENTION

Against this technical background, the object of the present invention, then, is to provide reactive one-component granules, especially one-component coating-material and/or adhesive granules, which as a one-component system already include all of the reactive constituents and desired additives and can be used without prior metering.

A further object of the present invention is to provide reactive one-component granules, especially one-component coating-material and/or adhesive granules, which can be stored without problems and easily processed further, while having excellent adhesive or coating properties, respectively.

An additional object of the present invention is to provide efficient processes for preparing such reactive one-component coating-material and/or adhesive granules.

DETAILED DESCRIPTION OF THE INVENTION

In a first embodiment of the present invention, a process for preparing reactive one-component granules, especially one-component coating-material and/or adhesive granules, is described.

In the first embodiment of the process of the invention, the mixture is prepared in step (a), preferably in the absence of moisture, since the diisocyanate and/or polyisocyanate tends towards hydrolysis under the influence of moisture. Alternatively or additionally, the isocyanate-reactive starting polymer can be dried by evacuation before and/or during the preparation of the mixture in step (a). By evacuation is meant, in accordance with the invention, any application of reduced pressure or vacuum sufficient substantially to remove disruptive moisture.

The first embodiment of the process involves the isocyanate-reactive starting polymer being melted and then the diisocyanate and/or polyisocyanate introduced into this melt. In accordance with the invention, however, it is also possible to melt the diisocyanate and/or polyisocyanate, and then to introduce the isocyanate-reactive starting polymer into melt of diisocyanate and/or polyisocyanate.

The individual constituents can be melted at temperature from 50° C. to 300° C., in particular 100° C. to 275° C., preferably 150° C. to 250° C.

The isocyanate-reactive starting polymer is generally a thermoplastic polymer, i.e. a polymer which is thermoplastic below the temperature at which it crosslinks with the diisocyanate and/or polyisocyanate. Thermoplastics for the purposes of the invention are polymers which possess a flow transition range above the service temperature. They can be processed to shaped parts in the softened state by means of compression moulding, extrusion, injection moulding or other shaping methods.

According to the first embodiment of the process of the invention, the diisocyanates and/or polyisocyanates used can be aliphatic and/or aromatic diisocyanates and/or polyisocyanates. These diisocyanates and/or polyisocyanates may in particular have free terminal NCO groups. The diisocyanates and/or polyisocyanates that are suitable in accordance with the invention may be selected from the group consisting of diisocyanatodiphenylmethanes (MDIs), especially 4,4'-diisocyanatodiphenylmethane and 2,4'-diisocyanatodiphenylmethane, and also mixtures of different diisocyanatodiphenylmethanes; 1,5-diisocyanatonaphthalene (NDI); diisocyanatotoluenes (TDIs), especially 2,4-diisocyanatotoluene, and also TDI uretdiones, especially dimeric 1-methyl-2,4-phenylene diisocyanate (TDI-U), and TDI ureas; 1-isocyanato-3-isocyanatomethyl-3,5,5-trimethyl-cyclohexane (IPDI) and its isomers and derivatives, especially dimers, trimers and polymers, and also IPDI isocyanurate (IPDI-T); 3,3'-dimethylbiphenyl 4,4'-diisocyanate (TODI); 3,3'-diisocyanato-4,4'-dimethyl-N,N'-diphenylurea (TDIH); and also mixtures and prepolymers of the aforementioned compounds.

Diisocyanates and/or polyisocyanates which are particularly preferred in accordance with the invention are asymmetrically substituted diisocyanates and/or polyisocyanates having preferably two terminal NCO groups differing in reactivity. Particular preference is therefore given to the use of 2,4'-diisocyanatodiphenylmethane in the first embodiment of the invention. 2,4'-Diisocyanatodiphenylmethane possesses two different NCO groups in position 2 on the first aromatic and in position 4 on the second aromatic. The NCO group located in position 2, in contrast to the NCO group in position 4, is relatively slow to react and is therefore available for a longer period of time in the process of the invention. The reason for the different reactivity of the NCO groups in positions 2 and 4 lies in particular in the difference in their steric accessibility.

In the first embodiment of the invention, it is also possible to use mixtures of different diisocyanates and/or polyisocyanates. Particular preference is given in accordance with the invention to a mixture of 4,4'-diisocyanatodiphenylmethane and 2,4'-diisocyanatodiphenylmethane, preferably having a 2,4'-diisocyanatodiphenylmethane content of more than 20% by weight, in particular more than 30% by weight, preferably more than 40% by weight and very preferably more than 50% by weight. The weight figure is based on the isocyanate mixture. One example of a suitable mixture of 4,4'-diisocyanatodiphenylmethane and 2,4'-diisocyanatodiphenylmethane is the product mixture liquid at room temperature which is sold by Bayer AG under the name Desmodur® VP KA 8616.

The use of mixtures of 4,4'-diisocyanatodiphenylmethane and 2,4'-diisocyanatodiphenylmethane in the first embodiment of the process of the invention leads to a product which crosslinks even at room temperature under moisture exposure, the crosslinking process being activated and/or accelerated by exposure to heat and the heat exposure being necessary for adhesion processes (hot tack). The result is a product having relatively low reactivity and relatively high selectivity.

According to the first embodiment of the present invention the diisocyanate and/or polyisocyanate used may comprise a masked or blocked diisocyanate and/or polyisocyanate, which eliminates the blocking or masking groups in particular under heat and/or moisture exposure. Blocked or masked diisocyanates and/or polyisocyanates of this kind are known in the prior art. The selection of particular blocked or masked isocyanates suitable in accordance with the invention accordingly will depend on the application.

According to the first embodiment of the present invention, the diisocyanate and/or polyisocyanate used can be an encapsulated or surface-deactivated diisocyanate and/or polyisocyanate, i.e., a diisocyanate and/or polyisocyanate with retarded reactivity. Encapsulated or surface-deactivated diisocyanates and/or polyisocyanates are familiar from the prior art. Reference may be made, for example, to EP 0 204 970 A2 or the corresponding U.S. Pat. No. 4,888,124, WO 99/58590 A1 or else EP 0 922 720 A1, the disclosure content of each are hereby incorporated by reference. The surface deactivation may be accomplished, for example, by dispersing a pulverulent solid isocyanate in a solution of the deactivator, by introducing a melt of a low-melting isocyanate into a solution with the deactivator in a non-solvent liquid dispersion medium or else by adding the deactivator or a solution of the deactivator to a dispersion of the solid finely divided isocyanates, or vice versa. Deactivators used are, in particular, compounds having hydrophilic groups, such as amino groups or hydroxyl groups in particular, which are able to react with free-isocyanate groups of the isocyanate and so form a kind of surface shell on the isocyanates, which initially deactivates the isocyanates (e.g. amines, diamines, polyamines, alcohols, diols, polyols or the corresponding thio compounds). In particular, for the purposes of the present invention, the deactivator is selected in terms of identity and quantity such that the encapsulation or surface deactivation is diminished preferably at temperatures above room temperature, in particular at temperatures between 60° C. and 160° C.

The coating-material and/or adhesive granules can be prepared in step (b) of the process of the invention, by underwater granulation or with the aid of a discharge belt.

When underwater granulation is carried out, the melt is prepared in extrudable form close to the softening point as measured by the ring-and-ball method. The melt is then extruded through at least one opening in a die plate into a cooling liquid. This liquid is preferably water. Alternatively any other liquid suitable for effecting sufficient cooling of the extruded mass can be used for the purposes of the present invention. As it emerges from the die plate the extruded mass can be chopped up by means, for example, of rotating blades. Further details on underwater granulation can be found in the publications EP 0 410 914 A1, EP 0 014 467 A1 and DE-A 20 34 038, the entire disclosure of which are hereby incorporated by reference.

In the case of granulation with the aid of the discharge belt, operation is carried out in the absence of moisture, so that there is no hydrolysis of the moisture-reactive components.

The present invention further provides reactive one-component granules prepared by the first embodiment of the invention, and in particular one-component coating-material granules and/or one-component adhesive granules.

The reactive one-component coating-material and/or adhesive granules of the first embodiment comprise at least one isocyanate-reactive starting polymer and at least one diisocyanate and/or polyisocyanate. Optionally the granules of the invention may further comprise at least one catalyst and/or at least one wax and/or at least one resin and/or at least one preferably non-isocyanate-reactive polymer. The granules of the invention may contain an excess of diisocyanate and/or polyisocyanate. This amounts in particular to 0.5% to 30%, preferably 0.5% to 10%, more preferably 0.5% to 5%, very preferably 0.5% to 3%, and is preferably generated by free terminal isocyanate groups. Regarding the specifications and versions of the isocyanate-reactive starting polymer, of the diisocyanate and/or polyisocyanate, of the non-isocyanate-reactive polymer, of the resin, of the wax and of the catalyst reference is made to remarks above relating to the first embodiment of the process of the invention.

According to a second embodiment, the present invention provides a process for preparing reactive one-component granules, especially one-component coating-material and/or adhesive granules.

In the second embodiment, the melt can be formed in step (a) preferably by simultaneous melting of all the components.

The individual constituents can be melted at temperatures from 50° C. to 300° C., in particular 100° C. to 275° C., preferably 150° C. to 250° C.

According to the second embodiment, the coating-material and/or adhesive granules can be prepared in step (b) of the process of the invention by underwater granulation or with the aid of a discharge belt. Regarding the underwater granulation, reference is made to the process of the invention according to the first embodiment. In the case of granulation with the aid of the discharge belt, operation preferably takes place in the absence of moisture, so that there is no hydrolysis of the silane-functional polyolefin.

The silane-functional polyolefin for use in the second embodiment may be a silane-functional poly-α-olefin. Preferably, it is an amorphous poly-α-olefin. In order to ensure high reactivity of the silane-functional polyolefin, it may additionally be a silane-terminated polyolefin. These silane-functional polyolefins can be obtained by grafting a polyolefin. That polyolefin is preferably a polyolefin modified with trialkoxysilyl groups, especially trimethoxysilyl groups. However, other different, modified silane-functional polyolefins can also be used for the purposes of the second embodiment. A suitable example of a silane-functional polyolefin for use in accordance with the invention is the silane-functional poly-α-olefin sold by Degussa Hüls AG under the name VESTOPLAST® 206. This is a poly-α-olefin grafted with and/or substituted by trimethoxysilyl groups. The action of this compound derives from the fact that the silane functions of the VESTOPLAST® 206, following application in melt form, form firm chemical bonds between the polymer chains of the adhesive layer and the OH groups on the surface of the substrate to which the adhesive is applied. Following application of the melt, this leads to a distinct increase in the adhesion to the substrates. Moreover, as a result of the reactive nature of VESTOPLAST® 206, the adhesion to plastics such as polyesters and polyamides and also to metals, whose bonding or coating with amorphous poly-α-olefin is normally difficult, is also improved.

The present invention is additionally directed to the reactive one-component granules, and in particular one-component coating-material granules and/or one-component adhesive granules which are preparable according to the second process of the invention.

The reactive one-component coating-material and/or adhesive granules according to the second embodiment include at least one silane-functional polyolefin, at least one non-silane-functional polyolefin and at least one catalyst. Optionally, the reactive one-component coating-material and/or adhesive granules may comprise at least one wax and/or at least one resin and/or at least one additive.

Regarding the specific silane-functional polyolefin, of the non-silane-functional polyolefin, the catalyst, the wax, the resin and the additive, reference is made to the discussion relating to the second process of the invention set forth above.

The granules of the invention according to the first and the second embodiment are in the form in particular of pellets whose size may be from 1 mm to 10 mm, preferably 2 mm to 8 mm.

The granules of the invention according to the first and/or the second embodiment are preferably protected against effects of the ambient air, in particular against atmospheric humidity, or other influences. Preferably the granules are handled, stored and/or packaged in a manner protective against or impervious to atmospheric moisture. In particular this is accomplished by means of suitable, commercially customary packaging or the like.

The present invention also provides for the use of the reactive one-component coating-material and/or adhesive granules of the invention for adhesive bonding or coating. The granules of the invention can be used accordingly, for example, to bond foam cushions, upholstered furniture and mattresses. Continuous coatings as well, such as are used for wrapping profiles, can be carried out with the granules of the invention. Application in this case takes place in particular by spray, squirt, nozzle or roller application.

The present invention exhibits a number of advantages over the prior art:

The process of the invention according to the first and second embodiments provides one-component coating-material and adhesive granules in a simple and easy-to-implement way. No substantial provisions in terms of apparatus need be taken in order to implement the preparation process; instead, the preparation can be realized on apparatus which are exclusively familiar and industrially widespread.

The coating-material and adhesive granules of the invention, both according to the first embodiment and the second embodiment, include a one-component system. Mixing of the reactive constituents prior to application is therefore no longer necessary. Accordingly the possibility of a metering error does not exist.

Furthermore, the coating-material and adhesive granules are highly efficient, stable on storage and easy to use.

Further embodiments, modifications, variations and advantages of the present invention are readily apparent to and realizable for the person skilled in the art on reading the description, without him leaving the scope of the present invention.

The present invention is illustrated with reference to the following working examples, which in no way restrict the present invention.

EXAMPLE 1

Inventive Reactive One-Component Granules Based on Isocyanate-Terminated Polymers (Working Example According to the First Embodiment)

A mixture of:
60% by weight of polyester having an average molecular mass of about 20,000 g/mol and a hydroxyl number of 5,
20% by weight of ethylene/vinyl acetate copolymer having a VA content of 18% and a melt index of about 150,
20% by weight of low molecular mass aromatic hydrocarbon resin having a softening range of 75° C. to 85° C. and an acid number of less than 1 mg KOH/g is melted and admixed in a ratio of 7:1 with 1-isocyanato-3-isocyanatomethyl-3,5,5-trimethylcyclohexane (IPDI; isocyanate content: 17%; functionality between 3 and 4). The components of the mixture are left to react intimately with one another at 200° C.

The mixture prepared in this way is subsequently processed to granules by underwater granulation as described previously. For this purpose, the melt, which is in extrudable form and close to its softening point as measured by the ring-and-ball method, is extruded through an opening in a die plate into water. As it emerges from the die plate, the extruded mass is chopped up by means of a rotating blade. The product obtained is removed from the water and subsequently dried by means, for example, of powdering or evacuation of residual moisture. This yields a one-component adhesive granules which can be used, for example, to produce profiles with a core consisting of MDF or chipboard wrapped conventionally with veneer or with decorative paper or plastic foils.

EXAMPLE 2

Inventive Reactive One-Component Granules Based on Silane-Functional Polymers (Working Example According to the Second Embodiment)

A mixture of:
31.2% by weight of polyolefin of brand name Vestoplast® 708 from Degussa Hils AG,
62.4% by weight of hydrocarbon resin of brand name Escorez® 5320 from Exxon Deutschland GmbH,
6.2% by weight of wax of brand name Paraflint® and
0.2% by weight of dibutyltin dilaurate (DBTL) from Huntsman Corp. are melted in a 1:1.9 ratio together with a mixture of:
95% by weight of silanized polyolefin of brand name Vestoplast® 206 from Degussa Hüls AG and
5% by weight of PE wax (polywax 1000).

The components of the mixture are homogenized intimately with one another at 200° C.

The mixture thus prepared is subsequently processed to granules in the same way as in Example 1. This yields a silane-functional, one-component hot-melt adhesive in granule form, which can be used, for example, to produce profiles with a core consisting of MDF or chipboard wrapped conventionally with veneer or with decorative paper or plastic foils.

What is claimed is:

1. A process for preparing isocyanate-based reactive one-component storage-stable granules for use as a one-component coating-material or adhesive, the process comprising the following process steps:
   (a) preparing a mixture comprising:
      (i) 2 to 30% by weight based on the total weight of the mixture of at least one isocyanate selected from the group consisting of diisocyanates and polyisocyanates,
      (ii) 30 to 70% by weight based on the total weight of the mixture of at least one isocyanate-reactive polymer,
      (iii) 5 to 30% by weight based on the total weight of the mixture of at least one non-isocyanate-reactive wax, resin or polymer selected from the group consisting of ethylene/vinyl acetate polymers and copolymers, polyolefins, acrylates, methacrylates, and mixtures thereof,
   wherein preparing of the mixture is performed by melting of the constituents (i) to (iii) of said mixture or by heating of the constituents (i) to (iii) of said mixture until brought into a fluid state, and
   wherein preparing of the mixture is performed such that there exists an excess of isocyanate in the obtained mixture, with the proviso that the amount of free NCO groups in the mixture is in the range of from 0.5 to 30% by weight based on the total weight of the mixture;
   (b) preparing storage-stable granules starting from said mixture resulting from step (a); and
   storing, handling or packaging the granules for future use.

2. The process according to claim 1, wherein after step (b) the granules are powdered or coated.

3. The process according to claim 1, wherein the amount of free NCO groups in the mixture resulting from step (a) is in the range of from 0.5 to 5.0% by weight based on the total weight of the mixture.

4. The process according to claim 1, wherein the mixture comprises:
   (i) 5 to 20% by weight based on the total weight of the mixture of said at least one isocyanate,
   (ii) 40 to 60% by weight based on the total weight of the mixture of said at least one isocyanate-reactive polymer,
   (iii) 10 to 25% by weight based on the total weight of the mixture of said at least one non-isocyanate-reactive wax, resin or polymer.

5. The process according to claim 1, wherein the weight average molecular mass of the isocyanate-reactive polymer is in the range of from 10,000 to 50,000 g/mol.

6. The process according to claim 1, wherein the isocyanate-reactive polymer is selected from the group consisting of isocyanate-reactive polyesters, polycaprolactone polyesters, polyethers, polyurethanes, polyamides, polytetrahydrofurans, polyacrylates and polymethacrylates, in each case with isocyanate-reactive hydrogen atoms.

7. The process according to claim 1, wherein the isocyanate-reactive polymer has a hydroxyl number of at least 15 mg KOH/g.

8. The process according to claim 1, wherein the isocyanate is selected from the group consisting of aliphatic and aromatic diisocyanates and polyisocyanates.

9. The process according to claim 8, wherein the diisocyanates and polyisocyanates are selected from the group consisting of diisocyanatodiphenyl methanes (MDIs), and mixtures of different diisocyanatodiphenylmethanes; 1,5-diisocyanatonaphthalene (NDI); diisocyanatotoluenes (TDIs), dimeric 1-methyl-2,4-phenylene diisocyanate (TDI-U), and TDI-ureas; 1-isocyanato-3-isocyanatomethyl-3,5,5-trimethylcyclohexane (IPDI) and its isomers, dimers, trimers and polymers, and IPDI isocyanurate (IPDI-T); 3,3'-dimethylbiphenyl 4,4'-diisocyanate (TODI); 3,3'-diisocyanato-4,4'-dimethyl-N,N'-di-phenylurea (TDIH); and mixtures and prepolymers of the aforementioned compounds.

10. The process according to claim 1, wherein the non-isocyanate reactive polymer is selected from the group consisting of:
   (A) ethylene/vinyl acetate polymers and copolymers having vinyl acetate contents of between 12 and 40% by weight and melt indices (MFIs, DIN 53735) of 8 to 800;
   (B) polyolefins having weight average molecular weights of 5,000 to 20,000 g/mol and ring-and-ball softening ranges between 80 and 170° C.; and
   (C) styrene acrylates and methacrylates, as well as mixtures thereof.

11. Isocyanate-based reactive storage stable one-component granules for use as one component coating-material and/or adhesive granules, obtained by the process according to claim 1.

12. Isocyanate-based reactive one-component granules for use as a one-component coating-material and/or adhesive granules, said reactive one-component granules being in a storage stable form comprising:
   (i) 2 to 30% by weight based on the total weight of the granules of at least one isocyanate selected from the group consisting of diisocyanates and polyisocyanates,
   (ii) 30 to 70% by weight based on the total weight of the granules of at least one isocyanate-reactive polymer,
   (iii) 5 to 30% by weight based on the total weight of the granules of at least one non-isocyanate-reactive wax, resin or polymer selected from the group consisting of ethylene/vinyl acetate polymers and copolymers, polyolefins, acrylates, methacrylates, and mixtures thereof;
   wherein said granules comprise an excess of isocyanate, with the proviso that the amount of free NCO-groups is in the range of from 0.5 to 30% by weight based on the total weight of the granules.

13. A method of adhesive bonding of foam cushions, upholstered furniture and mattresses and for continuous coating purposes comprising the steps of:

removing the one-component granules according to claim 12 from storage or packaging and then applying the granules to a surface to be coated or bonded by spray, squirt, nozzle or roller application.

14. The process according to claim 1, wherein the mixture further comprises:

(iv) at least one catalyst.

15. The process according to claim 1, wherein the mixture further comprises:

at least one additive.

16. Isocyanate-based reactive one-component granules according to claim 12, which further comprise:

(iv) at least one catalyst.

17. Isocyanate-based reactive one-component granules according to claim 12, which further comprise:

(iv) at least one additive.

18. The process according to claim 1, wherein said storage stable granules are formed by underwater granulation, wherein the melted or fluid-state mixture formed according to step (a) is extruded through an opening in a die plate into water to form an extruded mass and the extruded mass is chopped into granules.

19. The process according to claim 18, further comprising removing said granules from the water and removing residual water from said granules by evacuation.

20. A process for preparing isocyanate-based reactive one-component storage-stable granules for use as a one-component coating-material or adhesive, the process comprising the following process steps:

(a) preparing a mixture comprising:
(i) 2 to 30% by weight based on the total weight of the mixture of at least one isocyanate selected from the group consisting of diisocyanates and polyisocyanates,
(ii) 30 to 70% by weight based on the total weight of the mixture of at least one isocyanate-reactive polymer,
(iii) 5 to 30% by weight based on the total weight of the mixture of at least one non-isocyanate-reactive wax, resin or polymer selected from the group consisting of ethylene/vinyl acetate polymers and copolymers, polyolefins, acrylates, methacrylates, and mixtures thereof, (b) melting of the constituents (i) to (iii) of said mixture or heating of the constituents (i) to (iii) of said mixture until brought into a fluid state, and (c) extruding said melted or fluid-state mixture through an opening in a die plate into water to form an extruded mass, chopping said extruded mass into granules, removing said granules from said water and removing residual water from said granules by evacuation.

21. Storage stable isocyanate-based reactive one-component granules for use as a one-component coating-material and/or adhesive granules, said reactive one-component granules made by a process comprising:

(a) preparing a mixture comprising:
(i) 2 to 30% by weight based on the total weight of the mixture of at least one isocyanate selected from the group consisting of diisocyanates and polyisocyanates,
(ii) 30 to 70% by weight based on the total weight of the mixture of at least one isocyanate-reactive polymer,
(iii) 5 to 30% by weight based on the total weight of the mixture of at least one non-isocyanate-reactive wax, resin or polymer selected from the group consisting of ethylene/vinyl acetate polymers and copolymers, polyolefins, acrylates, methacrylates, and mixtures thereof, (b) melting of the constituents (i) to (iii) of said mixture or heating of the constituents (i) to (iii) of said mixture until brought into a fluid state, and (c) extruding said melted or fluid-state mixture through an opening in a die plate into water to form an extruded mass, chopping said extruded mass into granules, removing said granules from said water and removing residual water from said granules by evacuation.

* * * * *